United States Patent
Shen et al.

(10) Patent No.: US 11,989,418 B2
(45) Date of Patent: May 21, 2024

(54) METHOD AND APPARATUS FOR UPGRADING SSD FIRMWARE COMPATIBLE WITH RAID SSD AND NON-RAID

(71) Applicant: SHENZHEN UNIONMEMORY INFORMATION SYSTEM LIMITED, Shenzhen (CN)

(72) Inventors: Rongjuan Shen, Shenzhen (CN); Daojing Han, Shenzhen (CN); Yifan Zou, Shenzhen (CN); Weiliang Wang, Shenzhen (CN)

(73) Assignee: SHENZHEN UNIONMEMORY INFORMATION SYSTEM LIMITED, Guangdong (CN)

( * ) Notice: Subject to any disclaimer, the term of this patent is extended or adjusted under 35 U.S.C. 154(b) by 0 days.

(21) Appl. No.: 17/043,465

(22) PCT Filed: Feb. 28, 2020

(86) PCT No.: PCT/CN2020/077087
§ 371 (c)(1),
(2) Date: Sep. 29, 2020

(87) PCT Pub. No.: WO2021/093222
PCT Pub. Date: May 20, 2021

(65) Prior Publication Data
US 2023/0132119 A1    Apr. 27, 2023

(30) Foreign Application Priority Data
Nov. 11, 2019    (CN) .......................... 201911093608.2

(51) Int. Cl.
G06F 3/06    (2006.01)

(52) U.S. Cl.
CPC .......... *G06F 3/0613* (2013.01); *G06F 3/0629* (2013.01); *G06F 3/0653* (2013.01); *G06F 3/0679* (2013.01)

(58) Field of Classification Search
CPC .... G06F 3/0613; G06F 3/0629; G06F 3/0653; G06F 3/0679
(Continued)

(56) References Cited

U.S. PATENT DOCUMENTS

| 6,996,819 | B1 * | 2/2006 | Alanis ...................... G06F 8/60 717/173 |
| 7,376,943 | B2 * | 5/2008 | Lu ....................... G06F 11/1433 714/E11.135 |

(Continued)

FOREIGN PATENT DOCUMENTS

| CN | 104503781 A | 4/2015 |
| CN | 105224253 A | 1/2016 |

(Continued)

OTHER PUBLICATIONS

Zuolo et al, "Memory System Architecture Optimization for Enterprise All-RRAM Solid State Drives", IEEE, pp. 1-4 (Year: 2016).*

(Continued)

*Primary Examiner* — Anil Khatri
(74) *Attorney, Agent, or Firm* — CANTOR COLBURN LLP

(57) ABSTRACT

A method for upgrading a SSD firmware compatible with an RAID and a non-RAID including: packing two firmware versions including an RAID firmware and a non-RAID firmware together, when the two firmware versions need to be released; adding a configuration information with a fixed length of bytes to a firmware header of a resulting packed firmware, in which the configuration information includes: index values, offsets, and file sizes of the RAID firmware (Continued)

and the non-RAID firmware; determining, according to an internal information of an SSD, whether a matching firmware version thereof is the RAID firmware or the non-RAID firmware; and comparing the internal information of the SSD with the configuration information of the firmware header, selecting a matching index value, and reading a corresponding firmware according to the offset and the file size.

12 Claims, 3 Drawing Sheets

(58) Field of Classification Search
USPC .................................. 717/168–174, 116–121
See application file for complete search history.

(56) References Cited

U.S. PATENT DOCUMENTS

| | | | | |
|---|---|---|---|---|
| 7,480,907 | B1* | 1/2009 | Marolia | G06F 8/65 |
| | | | | 717/172 |
| 8,266,611 | B2* | 9/2012 | Song | G06F 3/0638 |
| | | | | 717/173 |
| 8,577,613 | B2* | 11/2013 | Bryant | E21B 43/00 |
| | | | | 702/14 |
| 8,665,601 | B1* | 3/2014 | Mangay-Ayam, Jr. | |
| | | | | H05K 9/0066 |
| | | | | 361/728 |
| 8,938,731 | B2* | 1/2015 | Valentine | H04L 67/34 |
| | | | | 717/172 |
| 9,116,774 | B2* | 8/2015 | Rajagopalan | G06F 8/654 |
| 9,170,737 | B1* | 10/2015 | Gugliemino | G06F 3/0605 |
| 9,798,534 | B1* | 10/2017 | Yi | G06F 11/1076 |
| 9,886,259 | B2* | 2/2018 | Zhang | H04L 41/0873 |
| 10,042,634 | B1* | 8/2018 | Myers | H04L 67/34 |
| 10,263,844 | B1* | 4/2019 | Wu | G06F 8/654 |
| 10,558,453 | B1* | 2/2020 | Bhaskar | G06F 9/542 |
| 10,691,354 | B1* | 6/2020 | Kucherov | G06F 3/0689 |
| 2010/0262775 | A1 | 10/2010 | Ito et al. | |
| 2014/0059278 | A1* | 2/2014 | Schuh | G11C 29/16 |
| | | | | 711/103 |

FOREIGN PATENT DOCUMENTS

| | | |
|---|---|---|
| CN | 108804128 A | 11/2018 |
| CN | 109213509 A | 1/2019 |

OTHER PUBLICATIONS

Pingale et al, "Design aspects for Upgrading Firmware of a Resource Constrained Device in the Field", IEEE, pp. 903-907 (Year: 2016).*
Meijer et al, "Self-encrypting deception: weaknesses in the encryption of solid state drives", IEEE, pp. 72-87 (Year: 2019).*
Chen et al, "Software Support Inside and Outside Solid-State Devices for High Performance and High Efficiency", IEEE, pp. 1650-1665 (Year: 2017).*
Caulfield et al, "Providing Safe, User Space Access to Fast, Solid State Disks", ACM, pp. 387-399 (Year: 2012).*
Pingale et al, "Design aspects for Upgrading Firmware of a Resource Constrained Device in the Field", ACM, pp. 903-907 (Year: 2016).*
International Search Report for Application No. PCT/CN2020/077087.

* cited by examiner

METHOD AND APPARATUS FOR UPGRADING SSD FIRMWARE COMPATIBLE WITH RAID SSD AND NON-RAID

This application is a National Stage Application filed under 35 U.S.C. § 371 of International Patent Application No. PCT/CN2020/077087 with an international filing date of Feb. 28, 2020, designating the United States, now pending, and further claims foreign priority benefits to Chinese Patent Application No. 201911093608.2 filed on Nov. 11, 2019. The contents of all of the aforementioned applications, including any intervening amendments thereto, are incorporated herein by reference.

TECHNICAL FIELD

The present application relates to the technical field of solid-state hard drives, and more particularly to a method and an apparatus for upgrading a SSD firmware compatible with an RAID and a non-RAID.

BACKGROUND

A disk array refers to a redundant array of independent disks (RAID). In a word, the RAID is a combination of multiple independent hard disks (physical hard disks) in different manners to form a hard disk group (logical hard disk), so as to provide higher storage performance than a single hard disk and provide a data backup performance. The function of data backup is to use a backup information to restore damaged data once user data is damaged, thereby ensuring the safety of user data. From the user's perspective, the combined disk group serves as a single hard disk, and the user can perform partition, and format on such disk group.

In traditional technique, due to the differences in the use of hard disks between the RAID and the non-RAID, the SSDs that constitute storage devices have differences in hardware circuit design and firmware design. For SSD manufacturers, multiple SSD products may be developed at the same time, and different products and different capacities will have different firmware.

However, due to the difference between RAID and non-RAID, the number of firmware versions will be twice the original. In case of firmware upgrading, a lot of firmware versions need to be maintained, which consumes relatively high cost in both time and labor.

Technical Problems

One of the objects of embodiments of the present application is to provide a method and an apparatus for upgrading a SSD firmware compatible with an RAID and a non-RAID, which aims at solving the technical problem that multiple firmware versions are required to be maintained during the firmware upgrading for the RAID and the non-RAID.

Technical Solutions

In order to solve the above-described technical problems, embodiments of the present application adopt the following technical solutions:

A first aspect of the present application provides a method for upgrading an SSD firmware compatible with an RAID and a non-RAID. The method comprises the steps of:

packing two firmware versions comprising an RAID firmware and a non-RAID firmware together, when the two firmware versions need to be released;

adding a configuration information with a fixed length of bytes to a firmware header of a resulting packed firmware, where the configuration information comprises: index values, offsets, and file sizes of the RAID firmware and the non-RAID firmware;

determining, according to an internal information of an SSD, whether a matching firmware version thereof is the RAID firmware or the non-RAID firmware; and comparing the internal information of the SSD with the configuration information of the firmware header, selecting a matching index value, and reading a corresponding firmware according to the offset and the file size.

A second aspect of the present application provides an apparatus for upgrading an SSD firmware compatible with an RAID and a non-RAID. The apparatus comprises:

a packing module, configured for packing two firmware versions comprising an RAID firmware and a non-RAID firmware together, when the two firmware versions need to be released;

an addition module, configured for adding a configuration information with a fixed length of bytes to a firmware header of a resulting packed firmware, where the configuration information comprises: index values, offsets, and file sizes of the RAID firmware and the non-RAID firmware;

a determination module, configured for determining, according to an internal information of an SSD, whether a matching firmware version thereof is the RAID firmware or the non-RAID firmware; and a matching module, configured for comparing the internal information of the SSD with the configuration information of the firmware header, selecting a matching index value, and reading a corresponding firmware according to the offset and the file size.

A third aspect of the present application provides a computer device, comprising: a memory, a processor, and a computer program stored on the memory and configured for running on the processor; where the processor is configured for implementing the steps of the method for upgrading the SSD firmware compatible with the RAID and the non-RAID according to the first aspect when executing the computer program.

A fourth aspect of the present application provides a computer-readable storage medium, storing with a computer program, where the computer-readable storage medium is configured for implementing the steps of the method for upgrading the SSD firmware compatible with the RAID and the non-RAID according to the first aspect when being executed by a processor.

Advantages of the method and apparatus for upgrading an SSD firmware compatible with both the RAID and non-RAID are summarized as follows: when the two firmware versions need to be released, two firmware versions comprising the RAID firmware and the non-RAID firmware are packed together. The configuration information with a fixed length of bytes is added to the firmware header of the packed firmware, where the configuration information comprises: index values, offsets, and file sizes of the RAID firmware and the non-RAID firmware. It is then determined, according to the internal information of an SSD, whether the matching firmware version thereof is the RAID firmware or the non-RAID firmware. The internal information of the SSD is compared with the configuration information of the firmware header, the matching index value is selected, and a corresponding firmware is read according to the offset and the file size. According to the firmware configuration information packaged by the above method, the upgrade tool can accurately locate the SSD-adapted firmware, and then read it into the memory, and download the corresponding firmware to the SSD by sending a standard firmware upgrade command. By packing the RAID firmware and non-RAID firmware into one firmware package, according to a format predetermined by both the two versions of firmware and the firmware upgrading tool, the packed RAID and non-RAID firmware are presented as a unified firmware. Thereafter, the firmware package is parsed by the firmware upgrading tool according to the predetermined format, and an appropriate firmware is selected for upgrading. In this way, the working efficiency is greatly improved and the maintenance costs are reduced.

DETAILED DESCRIPTION OF THE EMBODIMENTS

In order to make the purpose, technical solutions, and advantages of the present application clearer, the present application is further describes in detail in combination with the following figures and embodiments. It should be understood that the specific embodiments described herein are only used to explain the present application, rather than limiting the present application.

Figure 1:
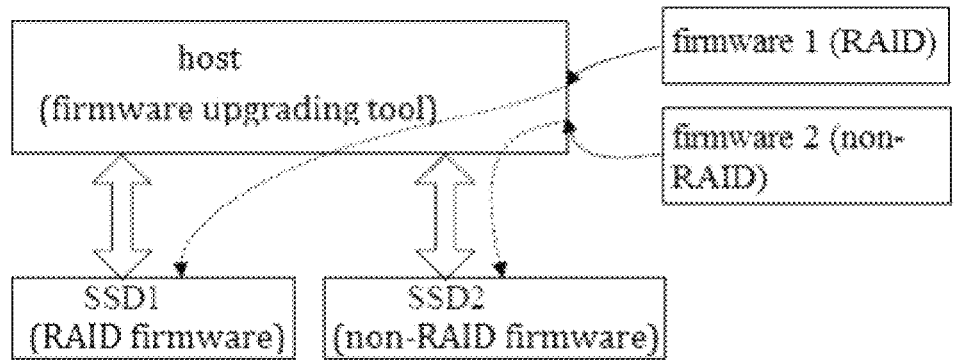
FIG. 1 is a schematic diagram of a traditional SSD firmware upgrading technique.

Refer to an existing firmware upgrade technical solution as shown in FIG. 1, currently, if two versions of RAID and non-RAID firmware need to be released, two firmware version are required to be managed and maintained. The RAID firmware is utilized to upgrade the SSD that supports the RAID function, and the non-RAID firmware is utilized to upgrade the SSD that does not support the RAID function. It is required to carefully distinguish the firmware versions when releasing the firmware upgrading packages, or else, cross-upgrading may easily resulted, which may possibly lead to the failure of the SSD to be recognized.

Based on this, the purpose of the present application is to provide a SSD firmware upgrading solution compatible with both the RAID and the non-RAID. According to a format predetermined by both the two versions of firmware and the firmware upgrading tool, the RAID firmware and non-RAID firmware are packaged into one firmware package, which is presented as a unified firmware. Thereafter, the firmware package is parsed by the firmware upgrading tool according to the predetermined format, and an appropriate firmware is selected for upgrading. In this way, the working efficiency is greatly improved and the maintenance costs are reduced.

Figure 3:
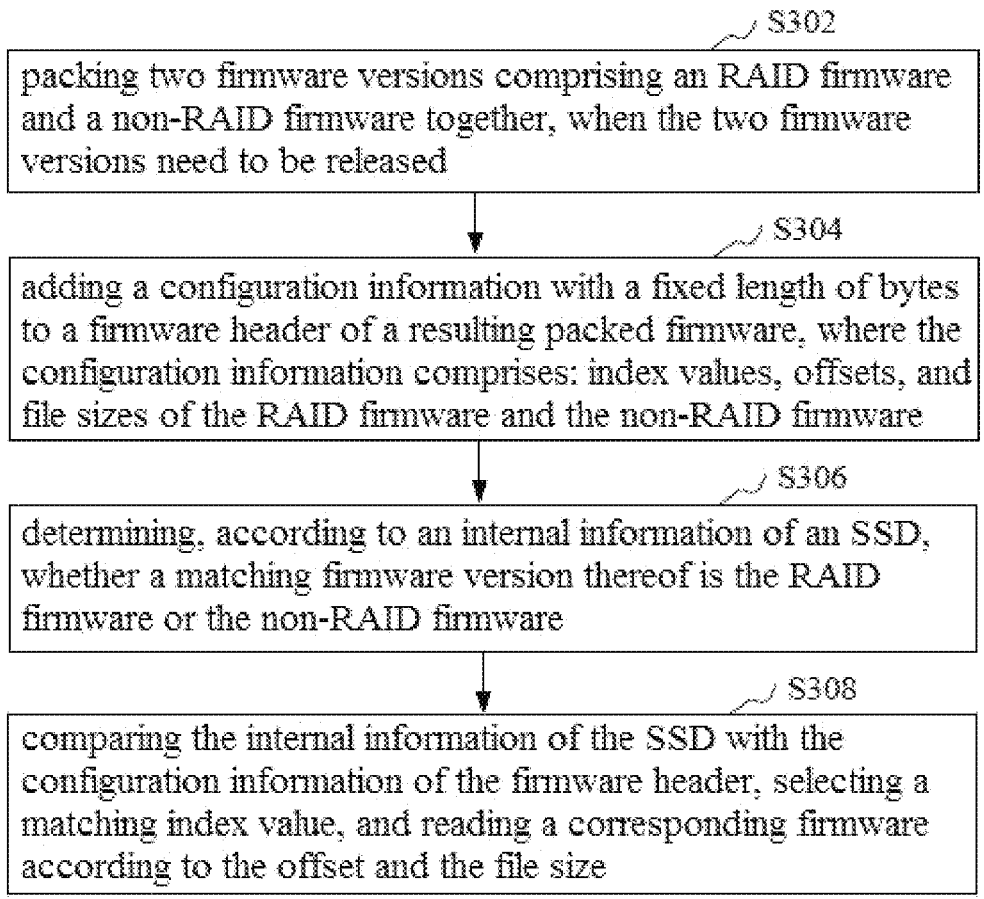
FIG. 3 is a schematic flowchart of a method for upgrading an SSD firmware compatible with an RAID and a non-RAID according to an embodiment.

In an embodiment, as shown in FIG. 3, a method for upgrading an SSD firmware compatible with an RAID and a non-RAID is provided, and the method includes:

step 302: packing two firmware versions comprising an RAID firmware and a non-RAID firmware together, when the two firmware versions need to be released;

step 304: adding a configuration information with a fixed length of bytes to a firmware header of a resulting packed firmware, where the configuration information comprises: index values, offsets, and file sizes of the RAID firmware and the non-RAID firmware;

step 306: determining, according to an internal information of an SSD, whether a matching firmware version thereof is the RAID firmware or the non-RAID firmware; and step 308: comparing the internal information of the SSD with the configuration information of the firmware header, selecting a matching index value, and reading a corresponding firmware according to the offset and the file size.

Figure 2:
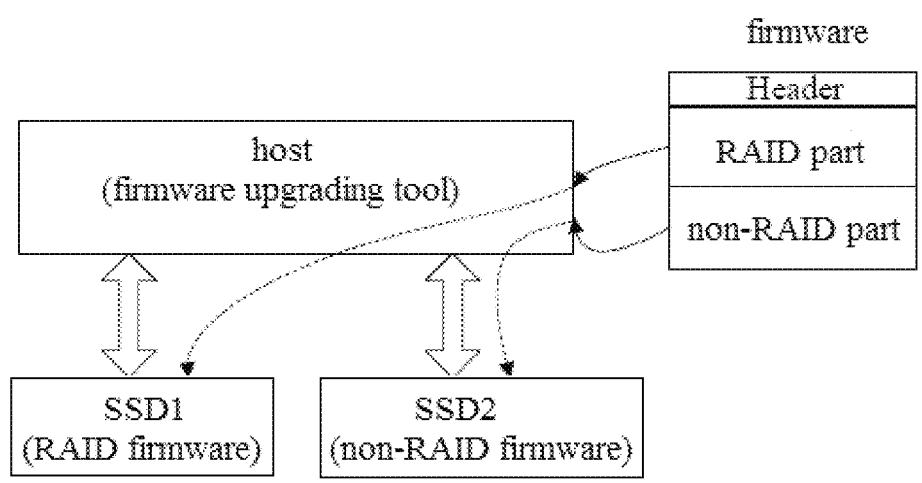
FIG. 2 is a schematic diagram of an SSD firmware upgrading technique in the present application.

In particular, combining with a flow chart of the SSD firmware upgrading technique as shown in FIG. 2, when the two versions of firmware respectively corresponding to the RAID and the non-RAID need to be released, the two versions of firmware are firstly packed together, and a configuration information with 512 bytes is added to the firmware heading, where the configuration information includes: index values, offsets, and file sizes, etc. of both the RAID firmware and the non-RAID firmware. In the meanwhile, a firmware upgrading tool is required to determine, according to the internal information of an SSD, whether a matching firmware version thereof is the RAID firmware or the non-RAID firmware, and then, to compare the internal information of the SSD with the configuration information of the firmware header, to select a matching firmware index value, and to read a corresponding version of firmware according to the offset and the file size. Such method can present the same packed firmware, and would not be affected by the possible confusion of the RAID and the non-RAID, and thereby reduce the cost of firmware maintenance and management.

In this embodiment, according to a format predetermined by both the two versions of firmware and the firmware upgrading tool, the RAID firmware and non-RAID firmware are packaged into one firmware package, which is presented as a unified firmware. Thereafter, the firmware package is parsed by the firmware upgrading tool according to the predetermined format, and an appropriate firmware is selected for upgrading. In this way, the working efficiency is greatly improved and the maintenance costs are reduced.

In one embodiment, the configuration information of the firmware header has a length of 512 bytes;

in which, Bytes 0-3 in the configuration information is magic bytes having a length of 4 bytes, set to be a fixed value, and configured for preliminary verification of firmware information; and a Byte 4 in the configuration information is configured for indicating the number of firmware versions that need to be package together.

In an embodiment, Bytes 5-16 in the configuration information stores a first firmware information, and is configured to identify the index value, the offset, the file size, and an internal information of the first firmware;

Bytes 17-28 in the configuration information stores a second firmware information, and is configured to identify the index, the offset, the size, and an internal information of the second firmware; and Bytes 29-511 in the configuration information are reserved bits.

In an embodiment, Bytes 0-1 in the first firmware information represent the index value of the first firmware;

Bytes 2-5 in the first firmware information represent the offset of the first firmware;

Bytes 6-9 in the first firmware information represent the file size of the first firmware;

Bytes 10-11 in the first firmware information represent the internal information of the first firmware, which is configured to be utilized by an upper-level firmware upgrading tool, such that the upper-level firmware upgrading tool determines whether the current firmware is a firmware compatible with the SSD according to the internal information.

Figure 4:
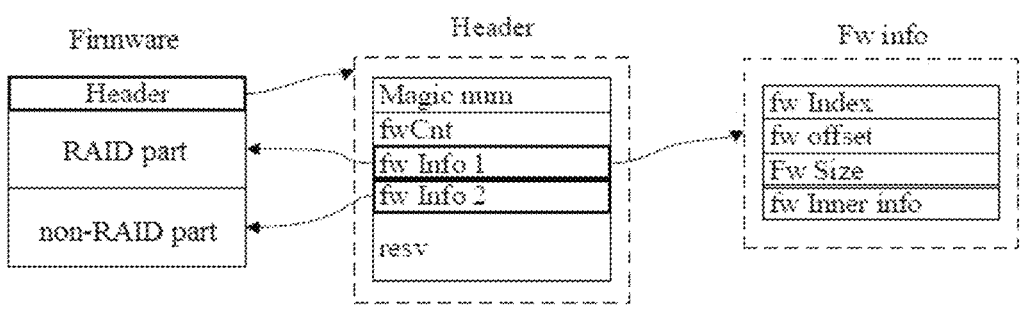
FIG. 4 is a schematic diagram of a firmware packaging format according to an embodiment.

In the above embodiment, with reference to FIG. 4, 512-byte configuration information involved in the firmware header in the embodiment is described in detail as follows:

Bytes 0-3: magic numbers, which includes 4 bytes, and are set as a fixed value and configured for preliminary verification of firmware information.

Byte 4: the number of firmware, which indicates the number of firmware that needs to be packaged together, if the firmware includes the RAID type and the non-RAID type, the number of firmware is set to be 2.

Bytes 5-16: configuration information for a single firmware, which occupies a total of 12 bytes, identifies the index, the offset, the size, the internal information and other information of the respective firmware.

Bytes 5-16, specifically, Byte 0-1: firmware index values, calculated with 0-base, the index value of the first firmware is set to 0, and the index value of the second firmware is set to 1; Byte 2-5: firmware offset, which means the offset relative to the first byte of the entire firmware, calculated with 0-base, the offset of the first firmware is set to be 512, and the offset of the second firmware is set to be 512+the size of the first firmware; Byte 6-9: the size of the firmware; Byte 10-11: the internal information of the firmware. This information is provided to the upper-level firmware upgrading tool, such that the tool determines whether the current firmware is SSD-compatible firmware based on this information.

Byte 17-28: configuration information of the second firmware, which is similar to Byte 5-16.

Byte 29-511: reserved.

In the above embodiment, according to the firmware configuration information packaged by the above method, the upgrade tool can accurately locate the SSD-adapted firmware, and then read it into the memory, and download the corresponding firmware to the SSD by sending a standard firmware upgrade command. By packing the RAID firmware and non-RAID firmware are packaged into one firmware package, according to a format predetermined by both the two versions of firmware and the firmware upgrading tool, The packed RAID and non-RAID firmware are presented as a unified firmware. Thereafter, the firmware package is parsed by the firmware upgrading tool according to the predetermined format, and an appropriate firmware is selected for upgrading. In this way, the working efficiency is greatly improved and the maintenance costs are reduced.

It should be understood that although the various steps in the flowchart of FIG. 3 are displayed in sequence as indicated by the arrows, these steps are not necessarily performed in sequence according to the order indicated by the arrows. Unless otherwise indicated in the present application, the execution of these steps is not strictly limited in order, and these steps can be executed in other orders. Moreover, at least part of the steps in FIG. 3 may include multiple sub-steps or multiple stages. These sub-steps or stages are not necessarily executed at the same time, but can be executed at different time periods. The execution of these sub-steps or stages is not necessarily performed in sequence, but may be performed alternately with other steps or at least a part of sub-steps or stages of other steps.

Figure 5:
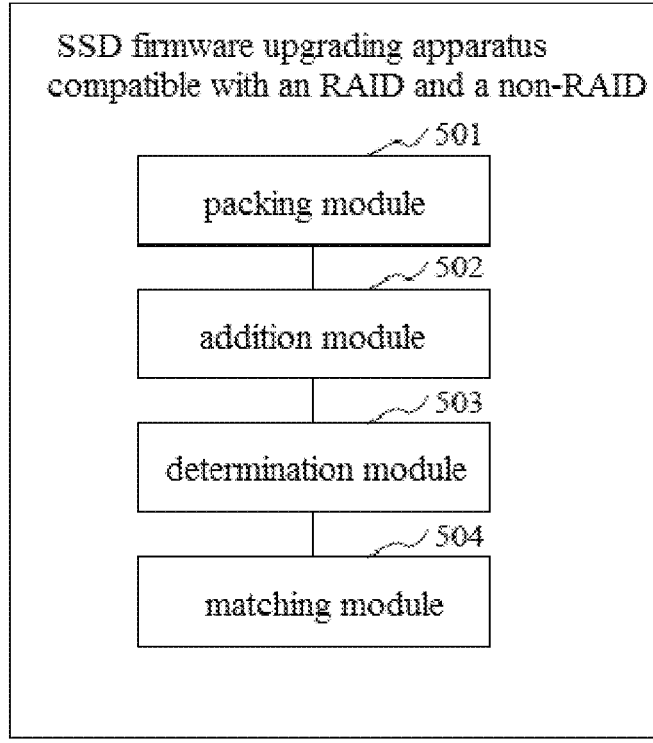
FIG. 5 is a structural block diagram of an apparatus for upgrading an SSD firmware compatible with an RAID and a non-RAID according to an embodiment.

In an embodiment, as shown in FIG. 5, an apparatus 500 for upgrading an SSD firmware compatible with an RAID and a non-RAID is provided, and the apparatus includes:

a packing module 501, configured for packing two firmware versions comprising an RAID firmware and a non-RAID firmware together, when the two firmware versions need to be released;

an addition module 502, configured for adding a configuration information with a fixed length of bytes to a firmware header of a resulting packed firmware, where the configuration information comprises: index values, offsets, and file sizes of the RAID firmware and the non-RAID firmware;

a determination module 503, configured for determining, according to an internal information of an SSD, whether a matching firmware version thereof is the RAID firmware or the non-RAID firmware; and a matching module 504, configured for comparing the internal information of the SSD with the configuration information of the firmware header, selecting a matching index value, and reading a corresponding firmware according to the offset and the file size.

In one embodiment, the configuration information of the firmware header has a length of 512 bytes;

in which, Bytes 0-3 in the configuration information is magic bytes having a length of 4 bytes, set to be a fixed value, and configured for preliminary verification of firmware information; and a Byte 4 in the configuration information is configured for indicating the number of firmware versions that need to be package together.

In an embodiment, Bytes 5-16 in the configuration information stores a first firmware information, and is configured to identify the index value, the offset, the file size, and an internal information of the first firmware;

Bytes 17-28 in the configuration information stores a second firmware information, and is configured to identify the index, the offset, the size, and an internal information of the second firmware; and Bytes 29-511 in the configuration information are reserved bits.

In an embodiment, Bytes 0-1 in the first firmware information represent the index value of the first firmware;

Bytes 2-5 in the first firmware information represent the offset of the first firmware;

Bytes 6-9 in the first firmware information represent the file size of the first firmware;

Bytes 10-11 in the first firmware information represent the internal information of the first firmware, which is configured to be utilized by an upper-level firmware upgrading tool, such that the upper-level firmware upgrading tool determines whether the current firmware is a firmware compatible with the SSD according to the internal information.

Specific limitations regarding the firmware upgrading apparatus compatible with both the RAID SSD and the non-RAID SSD may be refer to the limitations of the firmware upgrading apparatus compatible with both the RAID SSD and the non-RAID SSD, which will not be repeated herein.

Figure 6:
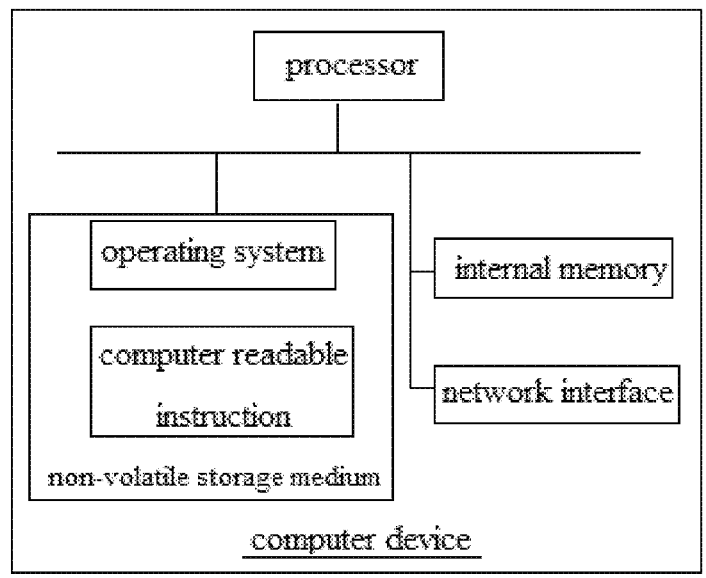
FIG. 6 is an internal structure diagram of a computer device according to an embodiment.

In an embodiment, a computer device is provided, and the internal structure diagram thereof may be as shown in FIG. 6. The computer device includes: a processor, a memory, and a network interface that are connected through device buses. Among them, the processor of the computer device is configured to provide calculation and control capabilities. The memory of the computer device includes: a non-volatile storage medium and an internal memory. The non-volatile storage medium stores an operating device, a computer program, and a database. The internal memory provides an environment for the operation of the operating device and the computer program in the non-volatile storage medium. The network interface of the computer device is configured to communicate with an external terminal through a network connection. When the computer program is executed by the processor, a method for upgrading a SSD firmware compatible with an RAID and a non-RAID is realized.

Those skilled in the art can understand that the structure shown in FIG. 6 is only a block diagram of part of the structure related to the solution of the present application, and does not constitute a limitation on the computer device to which the technical solution of the present application is applied. The specific computer device may include more or fewer parts than those shown in the figure, or combining some parts, or having a different arrangement of parts.

In an embodiment, a computer device is provided. The computer device comprises: a memory, a processor, and a computer program stored on the memory and configured for running on the processor. The processor is configured for implementing the steps of the above method embodiments when executing the computer program.

In an embodiment, a computer-readable storage medium, storing with a computer program is provided. The computer-readable storage medium is configured for implementing the steps of the above method embodiments when being executed by a processor.

Those skilled in the art can understand that all or part of the processes in the method as described in above-mentioned embodiments can be implemented by instructing relevant hardware through computer-readable instructions. The computer-readable instructions can be stored in a non-volatile computer-readable storage medium, when the computer-readable instructions are executed, they may include the processes of the above-mentioned method embodiments. Any reference to the memory, storage, database, or other media used in the embodiments provided in the present application may include a non-volatile and/or volatile memory. The non-volatile memory may include: a read-only memory (ROM), a programmable ROM (PROM), an electrically programmable ROM (EPROM), an electrically erasable programmable ROM (EEPROM), or a flash memory. The volatile memory may include: a random access memory (RAM) or an external cache memory. As an illustration but not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous chain Channel (Synchlink) DRAM (SLDRAM), a memory bus (Rambus) direct RAM (RDRAM), a direct memory bus dynamic RAM (DRDRAM), and a memory bus dynamic RAM (RDRAM), etc.

The technical features of the above embodiments can be combined arbitrarily. In order to make the description concise, not all possible combinations of the technical features in the above embodiments are described. However, as long as no contradiction exists between the combinations of these technical features, such combination should be considered as within the range described in the specification.

The above-mentioned embodiments are only several implementation manners of the present application, and the description thereof is relatively specific and detailed, but should not be understood as a limitation on the scope of the present application. It should be noted that for those skilled in the art, several modifications and improvements can be made, without departing from the concept of the present application, and such modifications and improvements fall within the protection scope of the present application. Therefore, the protection scope of the present application shall be subject to the appended claims.

What is claimed is:

1. A method for upgrading a solid-state disk (SSD) firmware compatible with a redundant array of independent drives (RAID) and a non-RAID, comprising the steps of:
   packing, by an SSD manufacturer, two firmware versions consisting of an RAID firmware and a non-RAID firmware together, when the two firmware versions need to be released;
   adding, by the SSD manufacturer, a configuration information with a fixed length of bytes to a firmware header of a resulting packed firmware,
   wherein the configuration information comprises: index values, offsets, and file sizes of the RAID firmware and the non-RAID firmware, respectively;
   determining, by a firmware upgrading tool in a host, according to an internal information of an SSD, whether a matching firmware version thereof is the RAID firmware or the non-RAID firmware;
   acquiring, by the firmware upgrading tool in the host, the configuration information of the firmware header from the SSD manufacturer;
   the resulting packed firmware is parsed by the firmware upgrading tool according to a predetermined format, and an appropriate firmware is selected for upgrading;
   comparing, by the firmware upgrading tool in the host, the internal information of the SSD with the configuration information of the firmware header, selecting a matching index value, and reading a corresponding firmware into a memory of the host, according to the offsets and the file sizes; and
   downloading, by the firmware upgrading tool, the corresponding firmware to the SSD by sending a standard firmware upgrade command, whereby upgrading the SSD firmware for the SSD in the host.

2. The method according to claim 1, wherein
   the configuration information of the firmware header has a length of 512 bytes;
   Bytes 0-3 in the configuration information is magic bytes having a length of 4 bytes, set to be a fixed value, and allows the firmware upgrading tool in the host for preliminary verification of firmware information; and
   a Byte 4 in the configuration information indicates the number of firmware versions that need to be package together.

3. The method according to claim 2, wherein
   Bytes 5-16 in the configuration information stores a first firmware information, and is configured to identify the index value, the offset, the file size, and an internal information of the first firmware;
   Bytes 17-28 in the configuration information stores a second firmware information, and is configured to identify the index, the offset, the size, and an internal information of the second firmware; and Bytes 29-511 in the configuration information are reserved bits.

4. The method according to claim 3, wherein
Bytes 0-1 in the first firmware information represent the index value of the first firmware;
Bytes 2-5 in the first firmware information represent the offset of the first firmware;
Bytes 6-9 in the first firmware information represent the file size of the first firmware; and
Bytes 10-11 in the first firmware information represent the internal information of the first firmware, which is configured to be utilized by an upper-level firmware upgrading tool, such that the upper-level firmware upgrading tool determines whether the current firmware is a firmware compatible with the SSD according to the internal information.

5. A computer device, comprising:
a memory, a processor, and a computer program stored on the memory and configured for running on the processor;
wherein the processor is configured for implementing the following steps when executing the computer program:
packing, by an SSD manufacturer, two firmware versions consisting of an RAID firmware and a non-RAID firmware together, when the two firmware versions need to be released;
adding, by the SSD manufacturer, a configuration information with a fixed length of bytes to a firmware header of a resulting packed firmware,
wherein the configuration information comprises: index values, offsets, and file sizes of the RAID firmware and the non-RAID firmware, respectively;
determining, by a firmware upgrading tool in a host, according to an internal information of an SSD, whether a matching firmware version thereof is the RAID firmware or the non-RAID firmware;
acquiring, by the firmware upgrading tool in the host, the configuration information of the firmware header from the SSD manufacturer;
comparing, by the firmware upgrading tool in the host, the internal information of the SSD with the configuration information of the firmware header, selecting a matching index value, and reading a corresponding firmware into a memory of the host, according to the offset and the file size; and
the resulting packed firmware is parsed by the firmware upgrading tool according to a predetermined format, and an appropriate firmware is selected for upgrading;
downloading, by the firmware upgrading tool, the corresponding firmware to the SSD by sending a standard firmware upgrade command, whereby upgrading the SSD firmware for the SSD in the host.

6. The computer device according to claim 5, wherein
the configuration information of the firmware header has a length of 512 bytes;
Bytes 0-3 in the configuration information is magic bytes having a length of 4 bytes, set to be a fixed value, and allows the firmware upgrading tool in the host for preliminary verification of firmware information; and
a Byte 4 in the configuration information indicates the number of firmware versions that need to be package together.

7. The computer device according to claim 6, wherein
Bytes 5-16 in the configuration information stores a first firmware information, and is configured to identify the index value, the offset, the file size, and an internal information of the first firmware;
Bytes 17-28 in the configuration information stores a second firmware information, and is configured to identify the index, the offset, the size, and an internal information of the second firmware; and
Bytes 29-511 in the configuration information are reserved bits.

8. The computer device according to claim 7, wherein
Bytes 0-1 in the first firmware information represent the index value of the first firmware;
Bytes 2-5 in the first firmware information represent the offset of the first firmware;
Bytes 6-9 in the first firmware information represent the file size of the first firmware; and
Bytes 10-11 in the first firmware information represent the internal information of the first firmware, which is configured to be utilized by an upper-level firmware upgrading tool, such that the upper-level firmware upgrading tool determines whether the current firmware is a firmware compatible with the SSD according to the internal information.

9. A non-transitory computer-readable storage medium, storing with a computer program, wherein the non-transitory computer-readable storage medium is configured for implementing the following steps when being executed by a processor:
packing, by an SSD manufacturer, two firmware versions consisting of an RAID firmware and a non-RAID firmware together, when the two firmware versions need to be released;
adding, by the SSD manufacturer, a configuration information with a fixed length of bytes to a firmware header of a resulting packed firmware,
wherein the configuration information comprises: index values, offsets, and file sizes of the RAID firmware and the non-RAID firmware, respectively;
determining, by a firmware upgrading tool in a host, according to an internal information of an SSD, whether a matching firmware version thereof is the RAID firmware or the non-RAID firmware; and
acquiring, by the firmware upgrading tool in the host, the configuration information of the firmware header from the SSD manufacturer;
comparing, by the firmware upgrading tool in the host, the internal information of the SSD with the configuration information of the firmware header, selecting a matching index value, and reading a corresponding firmware into a memory of the host, according to the offsets and the file sizes; and
the resulting packed firmware is parsed by the firmware upgrading tool according to a predetermined format, and an appropriate firmware is selected for upgrading;
downloading, by the firmware upgrading tool, the corresponding firmware to the SSD by sending a standard firmware upgrade command, whereby upgrading the SSD firmware for the SSD in the host.

10. The non-transitory computer-readable storage medium according to claim 9, wherein
the configuration information of the firmware header has a length of 512 bytes;
Bytes 0-3 in the configuration information is magic bytes having a length of 4 bytes, set to be a fixed value, and allows the firmware upgrading tool in the host for preliminary verification of firmware information; and
a Byte 4 in the configuration information indicates the number of firmware versions that need to be package together.

11. The non-transitory computer-readable storage medium according to claim 10, wherein
- Bytes 5-16 in the configuration information stores a first firmware information, and is configured to identify the index value, the offset, the file size, and an internal information of the first firmware;
- Bytes 17-28 in the configuration information stores a second firmware information, and is configured to identify the index, the offset, the size, and an internal information of the second firmware; and
- Bytes 29-511 in the configuration information are reserved bits.

12. The non-transitory computer-readable storage medium according to claim 11, wherein
- Bytes 0-1 in the first firmware information represent the index value of the first firmware;
- Bytes 2-5 in the first firmware information represent the offset of the first firmware;
- Bytes 6-9 in the first firmware information represent the file size of the first firmware; and
- Bytes 10-11 in the first firmware information represent the internal information of the first firmware, which is configured to be utilized by an upper-level firmware upgrading tool, such that the upper-level firmware upgrading tool determines whether the current firmware is a firmware compatible with the SSD according to the internal information.

* * * * *